United States Patent Office 2,860,087
Patented Nov. 11, 1958

2,860,087
RECOVERY OF KALLIKREIN

Heinrich Kraut and Willy Körbel, Dortmund, Germany, assignors to Farbenfabriken Bayer Aktiengesellschaft, Bayerwerk, Germany, a corporation of Germany No Drawing. Application August 24, 1953
Serial No. 381,146

Claims priority, application Germany August 25, 1952

11 Claims. (Cl. 167—74)

This invention relates to improvements in the recovery of kallikrein. It more particularly relates to the recovery of kallikrein from impure solutions thereof by the formation of zinc salts.

Kallikrein has been recovered from impure solutions by precipitation. This precipitation has been effected with a number of heavy metal salts such as uranyl acetate and basic lead phosphate. This is set forth in H. Kraut, E. K. Frey, E. Bauer and F. Schultz, Zs. physiol. Chem. 205, 99, 1932. The kallikrein is adsorbed to the precipitates formed by the heavy metals either with protein or phosphoric acid. These methods are, however, unsuited for the recovery of kallikrein from solutions of a higher purity since no precipitates will form.

One object of this invention is a new method for the recovery of kallikrein which may be used for obtaining kallikrein from solutions of a higher degree of purity, as well as from relatively impure solutions thereof. This and still further objects will become apparent from the following description:

It has now been found that kallikrein will form a salt with zinc which is readily soluble in water within the pH range of from about 4–7 and preferably from about 5–6, but is more difficultly soluble in dilute alcohol solutions as, for example, 30% strength or mixtures of organic solvents miscible with water as, for example, alcohol and acetone.

The kallikrein solution which can be treated in accordance with the invention may be any aqueous solution which contains kallikrein as, for example, the solutions described in the monograph "Kallikrein (Padutin)" by Frey, Kraut and Werle, Stuttgart, 1950, pages 121–130.

These zinc salts of kallikrein may be formed by adding zinc acetate to the kallikrein.

In place of the zinc acetate which is preferable, other soluble zinc salts, such as zinc sulfate, zinc nitrate or zinc chloride, may be used. However, when using salts other than the zinc acetate care must be taken that the solution does not contain cations capable of forming poorly soluble zinc salts. The invention is described in detail with reference to the zinc acetate but it is understood that these other soluble zinc salts may also be used. The amounts, concentrations, etc. of the zinc salts are limited only by their solubility and it is preferable that the solution should not be unduly diluted.

In accordance with the invention, the kallikrein may be recovered from its impure solution by adding zinc acetate to form the zinc salt of kallikrein and precipitating the zinc salt with the use of a dilute alcohol solution or an aqueous solution of appropriate organic solvents, such as acetone, dioxane and glycol or mixtures of these solvents. The kallikrein solution should be at a pH of 4–7 and preferably 5–6.

The concentration of the water miscible organic solvents, such as alcohol, is preferably 30%. If the solvent is used in a concentration of less than 30%, the yield is diminished. At higher concentrations, the end products are less pure. The concentration of the solvent, such as alcohol, used depends on the temperature. The concentration of 30% at a temperature around 0° C. yields the purest products in the best yields. If lower concentrations are used, it is necessary to use substantially lower temperatures.

The precipitation, in accordance with the invention, may be effected by adding the zinc acetate to a solution of kallikrein in dilute alcohol, as, for example, 30%, or other organic solvents, at a pH of 4–7 and preferably 5–6 and thereafter extracting the zinc salt of kallikrein from the precipitate with water or dilute neutral salt solution.

The precipitation may also be effected by adding the zinc acetate to an aqueous solution of kallikrein of a pH of 4–7 and preferably 5–6 to thereby precipitate the inactive ingredients which may be separated and then subsequently precipitating the zinc salt of kallikrein by adding alcohol or other organic solvents miscible with water such as acetone.

The zinc salt which is precipitated at the pH indicated in the presence of the solvent such as the alcohol, acetone, dioxane or glycol, is of a high degree of purity.

When starting with impure solutions of kallikrein which contain relatively high amounts of impurities, the addition of the zinc acetate causes voluminous precipitates of protein or zinc phosphate which adsorb the kallikrein. It is, therefore, advisable to add a dilute solution of a solvent such as alcohol or acetone as, for example, a 30% solution to these kallikrein solutions before the addition of the zinc acetate. This will cause the inactive contaminants to precipitate without any substantial loss of kallikrein. If the zinc acetate is added at this point, all of the zinc salts formed which are only slightly soluble in aqueous dilute alcohol solutions will precipitate together with the kallikrein. The zinc salt of the kallikrein may then be extracted from this precipitate with the use of a little water or a neutral salt solution as, for example, a normal saline solution, while the water insoluble zinc salts will remain in the precipitate and may be separated from the kallikrein salts.

The zinc salts of kallikrein are stable in aqueous solutions for long periods but cannot be obtained in the form of a dry powder by conventional methods without being substantially reduced in their biological activity. In accordance with the invention, it is possible to remove the zinc from the zinc salt solutions with the use of ion exchangers and to recover the kallikrein in the form of a biologically active dry powder in the conventional manner as, for example, by evaporating in vacuo or precipitating with alcohol or acetone. These powders may be used for the further purification of kallikrein contained therein.

The following example is given to illustrate the invention and not to limit the same:

Example

Three liters of a pancreatic autolysate are reacted with 1.5 liters of alcohol and the resulting precipitate is removed by centrifuging. The remaining clear solution is mixed with 50 grams of zinc acetate dissolved in 500 cc. of alcohol (30%). The precipitate which is formed immediately is separated after 12 hours by centrifuging and suspended in 1 liter of a physiological sodium chloride solution. The kallikrein-zinc salt dissolves and is separated from the precipitate by filtering. The yield amounts to about 80% of kallikrein, the degree of purity to 40–60γ for each kallikrein unit.

The solution of the zinc salt of kallikrein thus obtained is dialysed in cellophane bags against running water for 25 hours, the hydrogen ion concentration being kept between 5 and 6. Ten grams of zinc acetate per liter of liquid are added and the small quantity of precipitate free of kallikrein is removed by centrifuging. The solution is then adjusted to a content of 30% alcohol or acetone and the deposit which is gradually precipitated is collected in a centrifuge. The precipitate dissolves completely in water. The yield amounts to 60–80% of the kallikrein used. The degree of purity increases to 20–30γ per kallikrein unit.

The solution of the zinc salt of kallikrein is filtered through a column of cation exchangers charged with sodium chloride, mixed in the cold with four times the volume of alcohol, and the resulting precipitate removed by centrifuging after standing in the cold for a prolonged period and subsequently dried with acetone and ether. The yield is 60% of the acetive ingredient. The dry powder is water soluble and stable.

In the example the alcohol referred to is ethanol and may be any other water miscible alcohol. In place of the ethanol, acetone, dioxane or glycol may be used.

In place of the zinc acetate, zinc sulfate, zinc nitrate or zinc chloride may be used, though the acetate is preferable.

We claim:

1. Method for the separation of kallikrein from aqueous solutions thereof which comprises contacting an aqueous kallikrein solution with a water-soluble zinc salt selected from the group consisting of zinc acetate, zinc sulfate, zinc nitrate and zinc chloride to thereby form a zinc salt of kallikrein, precipitating said salt by maintaining the same in an aqueous solution of a water-miscible organic solvent at a pH of between about 4 and 7 and recovering the zinc salt of kallikrein from the precipitate formed.

2. Method according to claim 1, in which said precipitation is effected by adding said water-miscible organic solvent to said aqueous solution after said contacting with said water-soluble zinc salt to thereby form a dilute solution of sufficient concentration to cause the precipitation of said zinc salt of kallikrein.

3. Method according to claim 1, in which said precipitation is effected by contacting said aqueous kallikrein solution with said water-soluble zinc salt at a pH between about 4 and 7 in the presence of said water-miscible organic solvent so that said zinc salt directly precipitates upon formation.

4. Method according to claim 1, in which said water-soluble zinc salt is zinc acetate.

5. Method according to claim 1, in which said water-miscible organic solvent is selected from the group consisting of alcohol, acetone, dioxane, glycol and mixtures thereof.

6. Method according to claim 1, in which said contacting with said water-soluble zinc salt is effected at a pH of between 5 and 6 to thereby precipitate inactive ingredients contained in said aqueous solution of kallikrein and to form a water-soluble zinc salt of kallikrein and in which said zinc salt of kallikrein is subsequently precipitated by adding said water-miscible organic solvent.

7. Method according to claim 1, in which said zinc salt of kallikrein is recovered from the precipitate in the form of a solution and in which the zinc is removed from the said solution by contact with an ion exchanger and thereafter the kallikrein is dried and recovered.

8. Method according to claim 1, in which said zinc salt of kallikrein is recovered by extraction with a member selected from the group consisting of water and dilute neutral salt solutions.

9. Method according to claim 1, in which said water-miscible organic solvent is alcohol present in amount sufficient to form a solution of about 30% concentration.

10. Method according to claim 1, in which said aqueous solution of said water-miscible organic solvent has a concentration of about 30%.

11. Method according to claim 10, in which said water-miscible organic solvent is selected from the group consisting of alcohol, acetone, dioxane, glycol and mixtures thereof.

References Cited in the file of this patent

UNITED STATES PATENTS

| 2,174,862 | Sahyun | Oct. 3, 1939 |

FOREIGN PATENTS

| 59,267 | Denmark | Dec. 1941 |

OTHER REFERENCES

Somogyi: J. of Biol. Chem., vol. 86, April 1930, pp. 655–663 (p. 657 relied upon).

Sahyun: Am. J. of Physiology, vol. 125, No. 1, January 1939, pp. 24–30.

Bischoff et al.: J. Biol. Chem., vol. 109, April–May 1935, pp. 419–427 (pp. 419, 420, 423 and 425 pert.).